3,433,152
APPARATUS FOR PRODUCING CONTRAST COLOR EMBOSSMENTS IN PLASTICS
James William Mullen, Orinda, and Leo Tan de Bos, Albany, Calif., assignors to Dymo Industries, Inc., Emeryville, Calif., a corporation of California
Filed Oct. 27, 1964, Ser. No. 406,799
U.S. Cl. 101—28          2 Claims
Int. Cl. B44b 5/02; B29c 1/00

ABSTRACT OF THE DISCLOSURE

A die set for producing a contrast color embossment in a planar plastic sheet through permanent deformation of the sheet by cold forming of the material of the sheet, the die set including a die having a cavity with a draft angle of about 5° and a punch with a draft angle of about 17°.

---

The present invention relates, in general, to the provision of contrast color lettering or enfigurement upon a plastic sheet and, more particularly, to means for cold forming or embossing a contrast color relief enfigurement in plastic sheets.

It is now well known that a contrast color embossment may be provided in certain sheeted thermoplastic resins by means of cold forming methods such as cold drawing or embossing cold material in cold dies. In this manner, plastic articles such as labels, signs, plates, etc., having contrasting color embossments are produced quickly, conveniently and without complex or expensive equipment.

The discovery that certain rigid plastic sheet materials will develop a highly contrasting or opaque color value in regions subjected to cold flow, i.e., viscoelastic deformation, and the practical applications of that discovery are discussed in United States Patents, No. 2,925,625 and No. 2,996,882 wherein there are disclosed materials and methods which take advantage of the phenomena whereby such opacity or color change is produced. One of the more common means now employed to effect such deformation for the purpose of providing a variety of decorative and highly utilitarian articles is mating embossing dies. While orinary mating dies can give satisfactory results in embossing a variety of characters and enfigurements in the above plastic sheet materials, it has been found that the delineation and definition of such embossments can be enhanced and characters which are aesthetically more pleasing can be produced by mating dies, or a die set, having a configuration especially constructed to effect such embossments, and which accommodate the characteristics of the deformation which produces the opacity or color change.

It is therefore an important object of the invention to provide means for producing a contrast color embossment of improved definition and appearance in a plastic sheet by permanent deformation of the sheet.

Another object of the invention is to provide means for establishing such a contrast color embossment of greater aesthetic appeal in a plastic sheet.

Still another object of the invention is to provide a die set which will permanently deform a plastic sheet to form a raised character of contrasting color therein in such a way as to increase the area of contrasting color along the crest of the character and improve the definition of the character against the original background.

A further object of the invention is provide a die set of simplified design and construction for permanently deforming a plastic sheet to establish a contrast color embossment of enhanced and consistent quality.

The invention contemplates apparatus for establishing a contrast color embossment in a planar plastic sheet, the sheet having a substantially uniform color and capable of being permanently deformed to produce a contrasting color at permanently deformed portions. The embossment is provided with a root at the sheet, a raised crest, flanks connecting the raised crest and the root, the flanks being essentially normal to the plane of the sheet, and contrast color producing permanent deformation extending along the crest and along a sufficient portion of each flank to establish a well delineated contrasting color along a maximum extent of the width of the embossment. The apparatus includes a die set for producing the above outlined contrast color embossment, the die set having first means for providing a cavity extending in height generally normal to the plane of the plastic sheet and second means providing a punch for deforming the plastic sheet into the cavity to establish the embossment. The first and second means are provided with such relative proportions as to render the flanks of the embossment essentially normal to the plane of the sheet and to effect contrast color producing deformation at the crest and along the flanks to a maximum extent along the width of the embossment.

The invention will be more fully understood and further objects and advantages will become apparent in the following detailed description of an embodiment of the invention illustrated in the accompanying drawings, in which.

The phenomenon which produces opacity or color change in certain rigid plastic sheet is not completely understood and, for the purposes of the instant disclosure, need not be fully explained. It is sufficient to note that such changes appear to occur in certain portions of the plastic sheet as a result of permanent deformation of these portions. Such permanent deformation may be referred to as contrast color producing deformation since areas of contrasting color will appear in such a plastic sheet corresponding to the permanent deformation of the sheet.

In general, it has been found that suitable compositions for the plastic sheet can be produced from materials formulated and processed to produce sheeting having properties similar to those known in the trade as "rigid plastic sheeting." More particularly, straight unplasticized polyvinyl chloride and polyvinyl chloride-polyvinyl acetate copolymers including types I and II may be so employed; however, since the present results are believed to be due to the physical structure and properties of the sheeting, other rigid plastics may be processed to yield a similar product. For present purposes the term "rigid" is intended to indicate a material for which the yield point occurs at a low degree of elongation and further elongation proceeds with viscoelastic stretching commonly termed "cold flow." Invariably, the color change region is found to begin near the yield point and to extend to the point of film rupture. The production of suitable sheet materials is fully disclosed in the patents cited above.

In the employment of the above phenomenon for the production of utilitarian articles such as embossed labels, identification tags, plaques, name plates and the like, conventional embossing has been employed to produce lettering upon a planar sheet, for example, and the embossed characters generally have been comprised of a raised crest connected to the sheet by flanks lying between the raised crest and the root of the embossment at the sheet.

Figure 1:
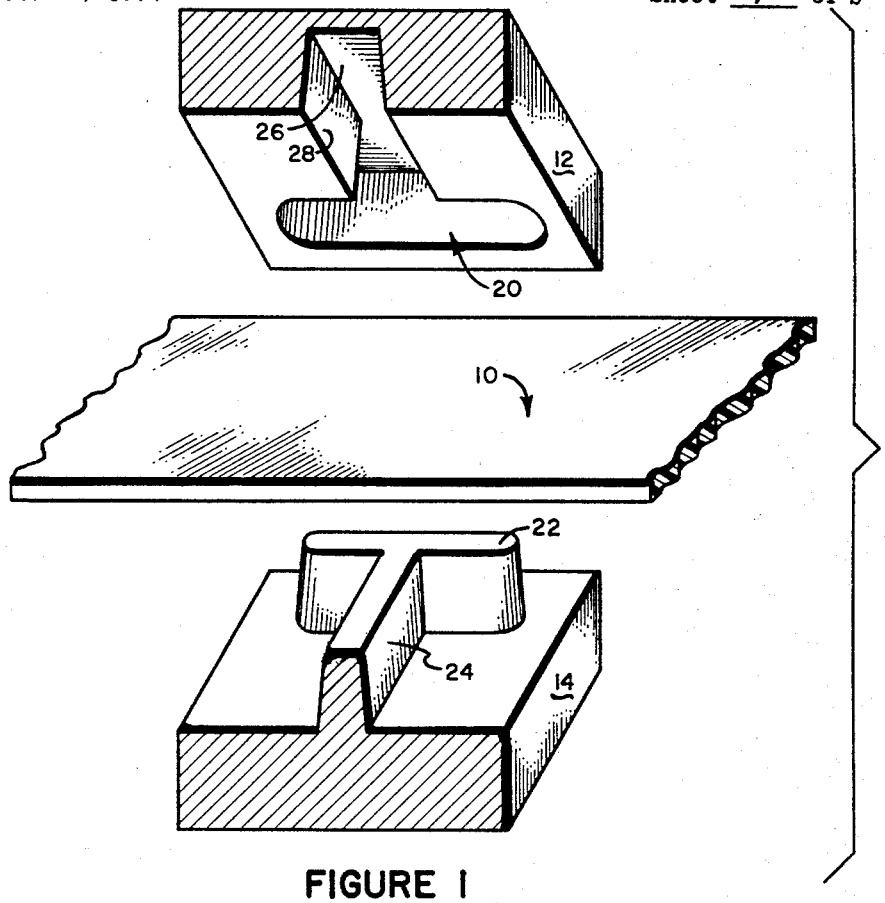
FIGURE 1 is a diagrammatic sectioned perspective view illustrating a die set of the invention and its use in the invention.
Figure 3:
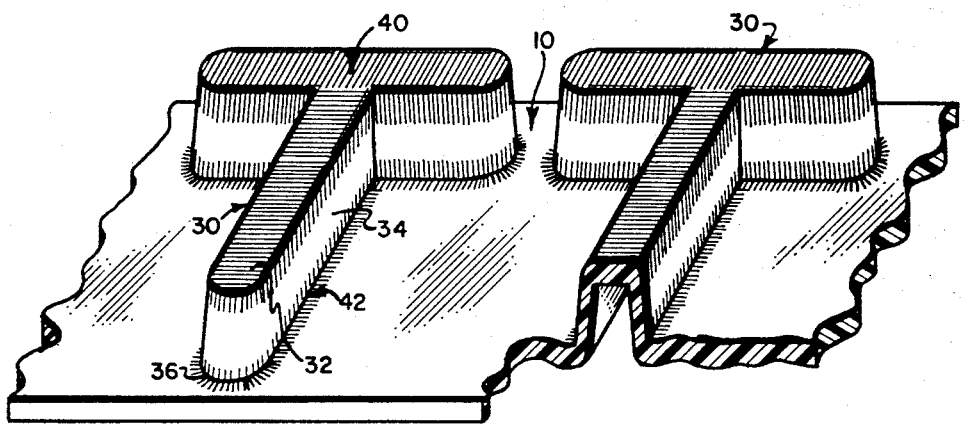
FIGURE 3 is a perspective view illustrating a finished embossment.

Turning now to the drawings, FIGURE 1 illustrates a planar sheet 10 of plastic capable of being permanently deformed to produce a contrasting color at permanently deformed portions. The permanent deformation, or embossing, is accomplished in the illustrated embodiment through the employment of a die set made up of a die 12 and a punch 14. The die is provided with a cavity 20 which extends generally normal to the plane of the plastic sheet 10 to define the outline of the character to be embossed in the sheet. As the die set is brought into mating relationship, the punch 14 deforms the plastic sheet into the die 12, the top 22 and side faces 24 of the punch 14 forcing the plastic sheet material against the bottom 26 and side walls 28 of the cavity, until, as best seen in FIGURE 2, the punch 14 has completed its travel into the die 12 and a character or enfigurement 30 is permanently embossed in the sheet as seen in FIGURE 3, the character 30 having a raised crest 32 and flanks 34 connecting the crest 32 to the planar sheet 10 at the root 36 of the character.

Figure 2:
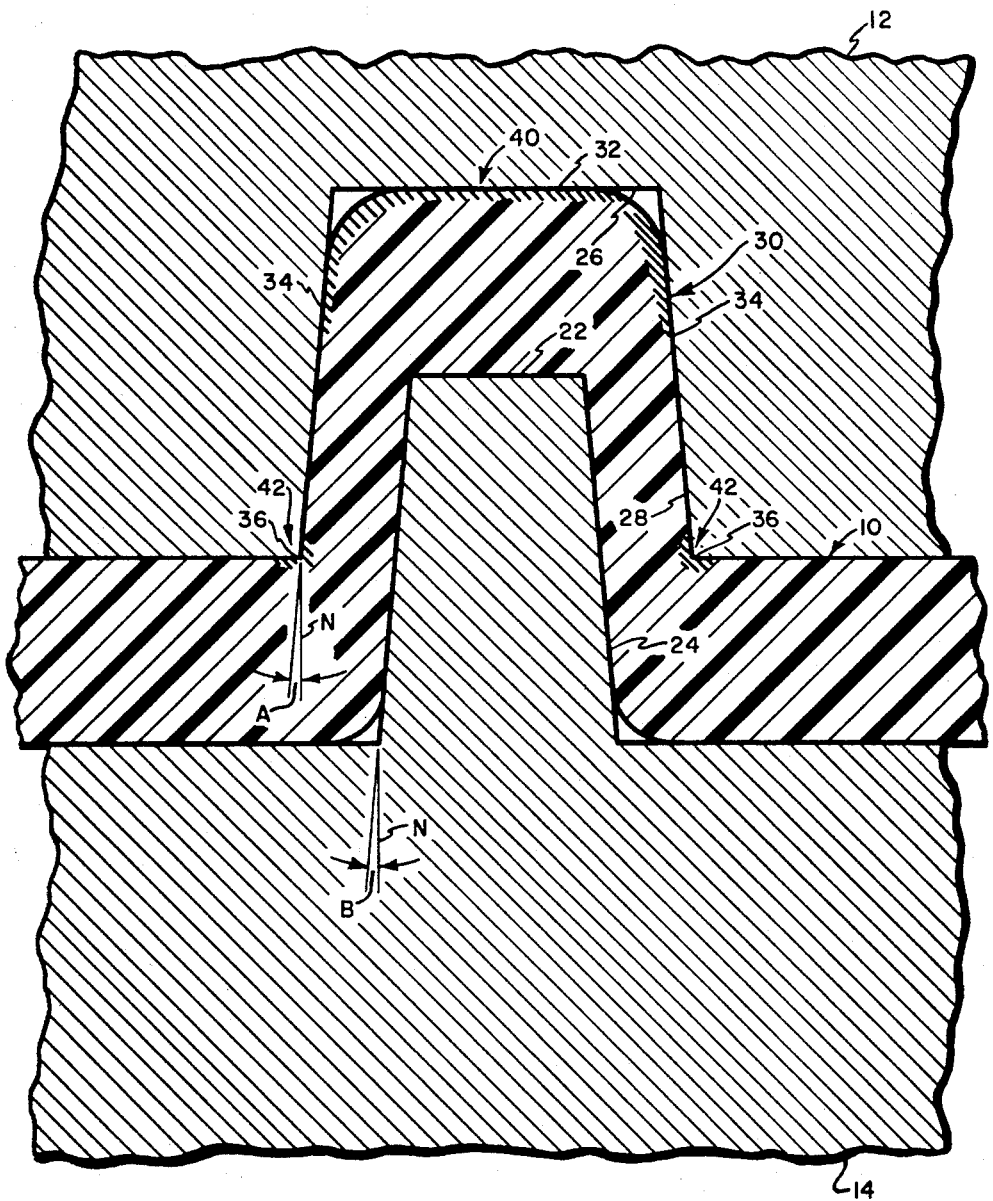
FIGURE 2 is an elevational cross-sectional view illustrating the details of a die set and the configuration of and formation in accordance with the teachings of an embossment of the invention.

Referring now more particularly to FIGURE 2, the embossing operation which produces the character 30 permanently deforms portions of the sheet 10 in order to establish the raised crest 32 and flanks 34, which flanks extend from the sheet 10 and culminate in crest 32, and effects contrast color producing deformation along portions indicated by the shaded area 40 which extends along the crest 32 and along a portion of each flank 34. It is this contrasting color which provides a legible character and gives rise to the practical utilization of the above discussed phenomenon. The contrast color producing deformation in area 40 is evidently a result of the stretching of the plastic material of sheet 10 over the top 22 of the punch 14.

Some contrast color producing deformation is also produced along portions indicated by the shaded areas 42 which extend along the root 36 of the embossed character 30. Such deformation is evidently the result of the stretching of the plastic material of sheet 10 over the boundaries of the cavity 20 in the formation of the embossed character 30.

In conventional embossing operations employed to produce lettering upon a planar plastic sheet, for example, embossed characters generally have been provided with a configuration wherein the flanks have made a rather substantial angle with the normal to the plane of the sheet, the angle generally being in the vicinity of 30°. Such an angle, which is indicated in FIGURE 2 as angle A lying between the face of each flank 34 and the line N which is normal to the plane of sheet 10, was felt to be necessary to maintain ease and accuracy in the embossing operation without failure of the sheet while still producing a legible character. The angle between normal N and the side faces 24 of punch 14, indicated by angle B, was maintained at the same substantial angle; that is, in the vicinity of 30°.

As a result of the relatively large angles A and B, the separation of each of the areas 40 and 42, the areas in which the contrasting color lies, was clearly distinguishable by the eye and the embossed characters assumed what might be termed a "halo effect," with the contrasting color produced by permanent deformation extending along the crest and along the root of the character and the original sheet color visibly dividing the two separate areas of contrasting color.

It has been found that the delineation and definition of embossed characters and enfigurements can be enhanced and can be made more aesthetically pleasing by more closely controlling the configuration of the embossment and the deformation of the plastic sheet so as to reduce the "halo effect."

It has been discovered that the appearance of contrasting color characters and enfigurements embossed in plastic sheets may be enhanced by establishing a configuration in such characters which will have the effect of reducing the "halo effect" to a minimum by reducing to a minimum the angle between each flank 34 and the line N, which is normal to the planar sheet (angle A in FIGURE 2). By assuring that flanks 34 are essentially normal to the plane of the sheet 10, the width between flanks is increased to a maximum in proportion to the width of the character 30 at the root 36 and area 40 is made to extend along the entire width between the flanks. Additionally, the relatively sharp bend in the vicinity of the intersection of the crest 32 with each flank 34 will cause the contrast color producing deformation, and hence the contrasting color, to extend along the flanks 34 toward root 36 to reduce the area of original color remaining on the flanks. While a separate area 42 of contrasting color must appear at the root 36 of the character 30, it is noted that the character 30 will usually be viewed from a direction lying along the normal to the plane of sheet 10 and the essentially normal orientation of the flanks 34 in combination with the reduced area of original color on the flanks 34 and the increased width of contrasting color on the crest 32 will effectively mask the original color remaining on the flanks and tend to eliminate the "halo effect."

Ideally, greater advantage of the above described masking effect can be realized in the elimination of the "halo effect" as angle A approaches zero and flanks 34 become oriented normal to the plane of sheet 10. However, practical considerations in the design and construction of a die set for accomplishing the embossing of character 30 require that the operating portions of die 12 and punch 14 be provided with adequate draft to enable unfettered operation of the die set. It has been found that angle A can be increased to an angle in the order of magnitude of 5° without sacrificing a significant amount of the masking effect, and such an angle would supply sufficient draft for the side walls 28 of the cavity 20 to allow practical operation of the die set. Although angle B can be made to equal angle A, an even greater draft can be supplied to the side faces 24 of punch 14 to increase ease of operation while still rendering flanks 34 essentially normal to the plane of sheet 10 and without reducing the amount of permanent deformation necessary to extend area 40 of contrasting color to a maximum extent along the width of the embossment. Draft angles for the side faces 24 of the punch 14 up to an order of magnitude of 17° have been found to be quite satisfactory. Thus, the relative proportions of the punch and the die necessary to render the flanks of the embossment essentially normal to the plane of the sheet and to effect contrast color producing deformation at the crest and along the flanks of the embossment to a sufficient extent along the width of the embossment to reduce the "halo effect" to a minimum may be maintained even where the angles A and B are allowed to deviate over a limited range.

It will be apparent that the invention provides means for producing a contrast color embossment of improved definition and appearance in a plastic sheet by permanent deformation of the sheet.

It is to be understood that the above detailed description of an embodiment of the invention is provided by way of example only.

What is claimed is:

1. A die set for producing a contrast color embossment in a plastic sheet through permanent deformation of the sheet by cold forming, the embossment having a root at the sheet and a raised crest connected thereto by flanks, said die set comprising:

a die having a cavity for defining the limits of the embossment; and a punch for deforming the sheet into said cavity to establish the embossment;

the draft of the die having a draft angle in the order of magnitude of 5° and the draft of the punch being sufficient to effect minimum convergence of the flanks of the embossment from the root to the crest and effect contrast color producing deformation at the crest and along the flanks to a maximum extent along the width of the embossment, the punch having a draft angle up to the order of magnitude of 17°.

2. A die set for producing a contrast color embossment in a plastic sheet through permanent deformation of the sheet by cold forming, the embossment having a root at the sheet and a raised crest connected thereto by flanks, said die comprising:

a die having a cavity including a bottom and side walls for defining the limits of the embossment, each said side wall making a relatively small angle with the normal to the plane of the plastic sheet, the small angle between said normal and each said side wall being in the order of magnitude of 5°;

a punch including a top and side faces for entering said cavity in a direction along said normal for deforming the sheet into said cavity to establish the embossment, each said side face making an angle with the normal to the plane of the sheet sufficient to force the embossment to follow the contour of said die with the flanks at said relatively small angle, the angle between the normal and each side face of the punch being up to the order of magnitude of 17°.

References Cited

UNITED STATES PATENTS

| | | | |
|---|---|---|---|
| 2,781,552 | 2/1957 | Gray | 264—331 |
| 2,925,625 | 2/1960 | Souza | 161—162 |
| 2,996,822 | 8/1961 | Souza | 161—2 |
| 3,036,945 | 5/1962 | Souza | 161—120 |

MORRIS SUSSMAN, *Primary Examiner.*

U.S. Cl. X.R.

18—44; 161—138; 197—6.7; 346—137, 145

PO-1050
(5/69)

UNITED STATES PATENT OFFICE
CERTIFICATE OF CORRECTION

Patent No. 3,433,152                Dated March 18, 1969

Inventor(s) James William Mullen and Leo Jan de Bos

It is certified that error appears in the above-identified patent and that said Letters Patent are hereby corrected as shown below:

Column 1, line 38, "2,996,882" should read -- 2,996,822 --.
Column 1, line 67, the word -- to -- should be inserted between "is" and "provide".

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents